Patented Sept. 28, 1948

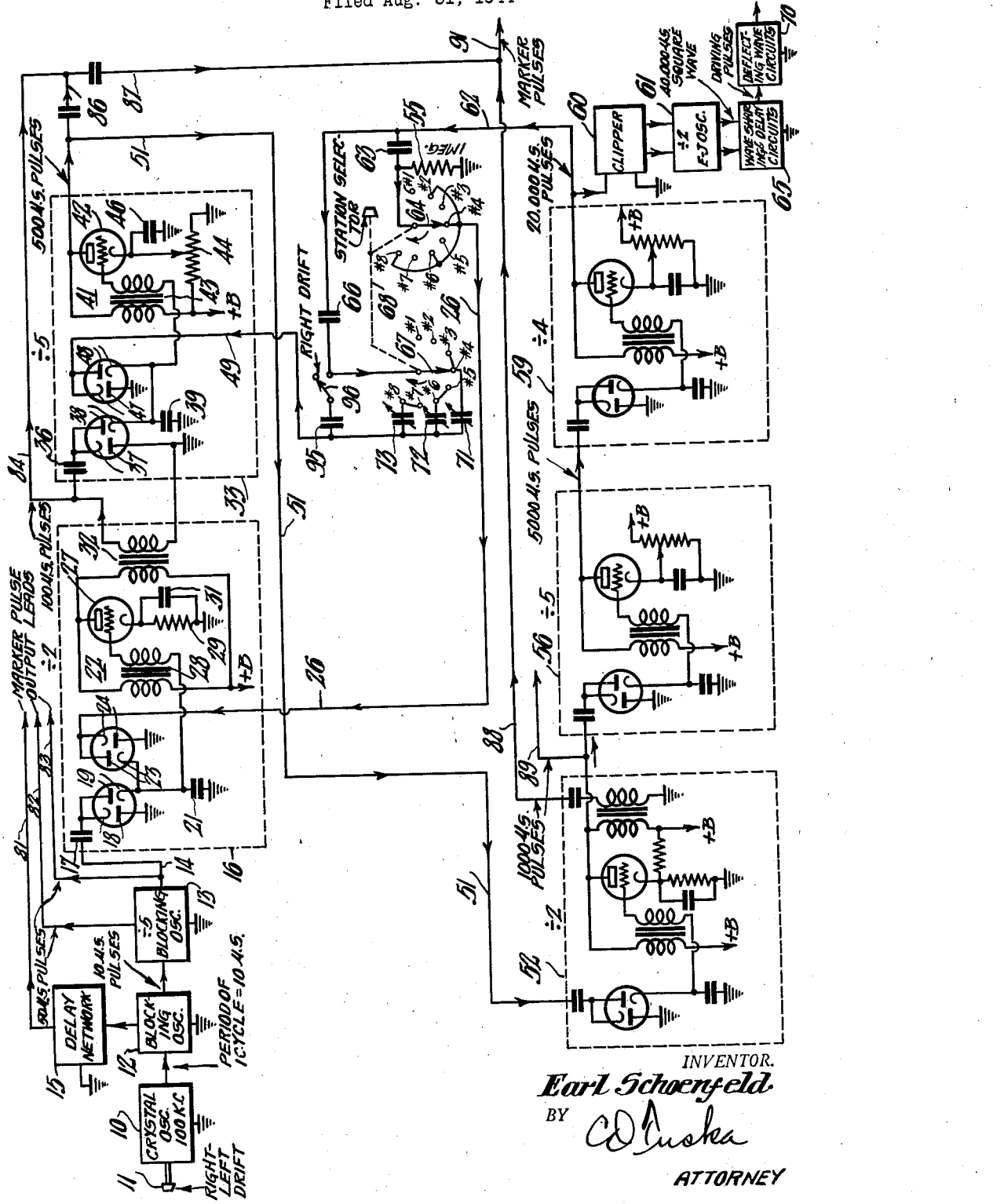

2,450,360

UNITED STATES PATENT OFFICE 2,450,360

TIMING MARKER AND STATION SELECTION APPARATUS

Earl Schoenfeld, Mamaroneck, N. Y., assignor to Radio Corporation of America, a corporation of Delaware Application August 31, 1944, Serial No. 552,146

9 Claims. (Cl. 250—27)

My invention relates to a system for producing periodic electrical pulses at selected periodic rates.

The invention is particularly applicable to navigation systems of the type employing pairs of synchronized ground stations that transmit radio pulses having at the instant of radiation a fixed time relation to each other. Each pair of ground stations transmits pulses having a different repetition period than that of the other pairs of stations. The pulses are radiated to receiving equipment located on the craft whose position is to be determined.

By means of the receiving equipment, the operator on the craft determines the time difference between the pulses from the two transmitter stations of one pair as they arrive at the receiver. Since the radio pulses travel from the ground transmitters to the receiver at a known propagation rate (i. e., at the velocity of light), it is known that the position of the craft is at some point on a line corresponding to the time difference reading. By obtaining the time difference reading from a second pair of ground stations a second line corresponding to the second time difference reading is obtained, and the intersect point of the two lines is the position of the craft. Special maps having "time difference" lines printed thereon for the several pairs of ground stations are provided for use with the navigation system.

My pulse producing system will be described as applied to the receiving apparatus in a system of the above-described type. In such systems, in order to measure the time difference in the arrival of successive pulses from a pair of ground stations it is necessary to produce timing marker pulses that have a known time interval between them. Also, it is necessary to obtain other pulses having a definite time relation to the time marker pulses for the purpose of driving or synchronizing deflecting circuits. These deflecting circuits produce cathode ray sweep traces on which the marker pulses and/or the received ground station pulses appear.

For the purpose of selecting a particular pair of ground stations, the operator must be able to select different repetition periods for the driving or synchronizing pulses whereby the deflecting circuits may be synchronized with the received pulses from the selected pair of ground stations.

Thus a particular pair of ground stations is selected at the receiver apparatus by turning a station selection switch to the position indicated on the receiver panel for obtaining sweep synchronizing pulses having the same repetition period as that of the pulses being transmitted from the selected pair of ground stations. Now the received pulses from the selected pair of ground stations can be made to appear stationary on the cathode ray sweep or trace whereas those received from the other pairs of ground stations will move rapidly along the same trace.

In operation, the pulses from the two transmitter stations of a selected pair of stations (which pulses will be referred to as A and B pulses, respectively) preferably are made to appear on two parallel cathode ray traces and are brought into alignment or coincidence by moving one of them along its cathode ray sweep trace. The latter is accomplished by adjusting the time that the sweep for the said one pulse begins. By various methods it is then possible to count certain timing markers appearing on the cathode ray sweep traces to determine the desired time difference.

An object of the present invention is to provide an improved method of and means for producing pulses having selected repetition periods.

A further object of the invention is to provide an improved pulse generator system for producing synchronizing pulses having an adjustable repetition period and for also producing groups of timing marker pulses with the repetition periods of the groups having a decimal relationship.

A still further object of the invention is to provide a system for producing pulses having selected repetition periods wherein, for each selected period, timing marker pulses are produced having repetition periods with a decimal relationship.

A still further object of the invention is to provide an improved timing pulse generator comprising a chain of frequency dividers wherein a number of different repetition periods for the timing pulses may be obtained and wherein the number of such repetition periods may be greater than the number by which any one frequency divider divides the frequency.

In accordance with the present invention, the timing pulse generator comprises a chain of frequency dividers which receives signal from a stable oscillator; it further comprises means for subtracting counts from a plurality of the frequency dividers. In the present example, the frequency dividers in which counts are subtracted are of the counter circuit type wherein a storage capacitor is charged in steps in response to the application of pulses. The count subtracting circuits comprise means for charging the storage capacitors an additional amount in response to the application of a pulse.

The invention will be better understood from the following description taken in connection with the accompanying drawing in which the single figure is a block and circuit diagram of the invention.

Referring to the drawing, a crystal oscillator 10 produces sine wave voltage of stable frequency which, in the example illustrated, is 100 kilocycles per second, the repetition period being 10 microseconds. The frequency of the oscillator output may be increased or decreased slightly by a manual adjustment as indicated at the control knob 11 for obtaining a right or left drift of a received pulse on a cathode ray sweep trace.

The crystal oscillator 10 drives a blocking oscillator 12 or the like to produce periodic pulses which, in the present example, also recur at the rate of 100 kc. per second. The repetition period or time interval between successive pulses is, therefore, 10 micro-seconds.

The frequency of the 10 $\mu$s. pulses is divided by five by means of a suitable frequency divider 13 such as a second blocking oscillator to produce 50 $\mu$s. pulses. While specific values are being given for the several frequency division steps, the invention is not limited to these particular values.

The 50 $\mu$s. pulses are applied through a lead 14 to a frequency divider 16 of the counter type described in White Patent 2,113,011. It divides the frequency by two to produce 100 $\mu$s. pulses. Also, an additional circuit is provided so that the divider 16 may be made to lose a "count" for the purpose of obtaining a different selected pulse repetition period.

The divider 16 comprises a counter circuit portion including an input or "bucket" capacitor 17, a pair of diodes 18 and 19, a "storage" capacitor 21 and a blocking oscillator portion 22. In addition, it includes a pair of diodes 23 and 24 associated with the storage capacitor 21 for the purpose of making the divider 16 lose a count upon the application of a pulse from a conductor 26 as will be explained hereinafter. The blocking oscillator 22 comprises a vacuum tube 27, a transformer 28 coupling the plate circuit to the grid circuit and a cathode biasing resistor 29 which is bypassed by a capacitor 31. A transformer 32 supplies the 100 $\mu$s. pulses from the divider 16 to a frequency divider 33 which also is of the type which may be made to lose a "count."

The frequency divider 16 operates as follows: Each of the 50 $\mu$s. pulses of positive polarity from the lead 14 puts a predetermined charge on the comparatively large capacity storage capacitor 21 as a result of a pulse of current through the comparatively small "bucket" capacitor 17 and through the diode 19, the capacity of the capacitor 17 being small enough so that capacitor 17 receives full charge before the termination of an applied pulse. At the end of this current pulse, the capacitor 17 is discharged to ground potential through the diode 18. The next 50 $\mu$s. pulse puts an additional current pulse into capacitor 21, this raising the voltage across capacitor 21 sufficiently to trigger the blocking oscillator 22 whereby a pulse is produced across the transformer 28 as is well understood in the art. The pulse thus produced is applied to the divider 33 with positive polarity. At the same time the blocking oscillator 22 discharges the capacitor 21 to bring it back to ground potential.

The frequency divider 33 divides the frequency by five to produce 500 $\mu$s. pulses. It includes a counter portion comprising a "bucket" capacitor 36, a pair of diodes 37 and 38, and a storage capacitor 39. It also includes a blocking oscillator portion 41 comprising a vacuum tube 42, a feedback transformer 43, a biasing resistor 44 and a bypass capacitor 46.

As in the preceding divider 16, there is provided in the divider 33 a pair of diodes 47 and 48 for subtracting counts. In the divider 33, however, the application of a pulse from a conductor 49 will subtract one, two or three counts depending upon the position of the station selection switch. The feature of subtracting counts in two frequency divider stages rather than in a single stage makes it possible to accomplish the objects of the invention.

The 500 $\mu$s. pulses are supplied over a conductor 51 to a frequency divider 52 that divides by two to produce 1000 $\mu$s. pulses. The divider 52 is similar to the divider 16 with the count subtracting diodes omitted, the circuit constants, of course, differing because of the different frequencies involved.

The 1000 $\mu$s. pulses are supplied to a frequency divider 56 that divides by five to produce 5000 $\mu$s. pulses which, in turn, are supplied to a frequency divider 59 that divides by four to produce 20,000 $\mu$s. pulses. The dividers 56 and 59 are similar to the divider 52 except for the difference in circuit constants.

The 20,000 $\mu$s. pulses may be passed through a clipping circuit 60 and supplied to a square wave generator 61, such as an Eccles-Jordan oscillator for obtaining a square wave having a repetition period of 40,000 $\mu$s. From this square wave are obtained, by means of suitable wave shaping and delay circuits 65, the desired driving or synchronizing pulses for the horizontal deflecting circuits 70.

The 20,000 $\mu$s. pulses are also supplied over a conductor 62 and through a "bucket" capacitor 63 of the first count subtraction circuit to a station selection switch 64; they are also supplied to the second count subtraction circuit through a coupling or blocking capacitor 66 of large capacity to a second station selection switch 67 which is ganged with the switch 64 as indicated by the broken line 68.

At the switch 64, alternate switch contact points are connected to the feedback conductor 26 whereby at these switch point positions the 20,000 $\mu$s. pulses are fed back to the divider 16 to subtract counts. It may be desirable because of distributed or stray capacity in the switch 64 to connect its switch arm to ground through a 1 megohm resistor 55 to permit charges to leak off.

At the switch 67, the last six switch contact points are connected in pairs, the three pairs of contact points No. 3–No. 4, No. 5–No. 6 and No. 7–No. 8 being connected through "bucket" capacitors 71, 72 and 73, respectively, to the feedback conductor 49 which leads to the second count subtraction circuit. Thus, with switch 67 in any one of the last six positions, 20,000 $\mu$s. pulses are applied to the divider 33 to subtract counts.

Before discussing in detail the operation of the count subtracting circuits for station selection, it may be noted that the desired timing marker pulses are obtained at various points along the frequency divider circuit. For example, for use with one particular system, the 10 $\mu$s. pulses are supplied from the blocking oscillator 12 through a delay network 15 to an output lead 81. The 50 $\mu$s. pulses are supplied to two output leads 82 and 83. The 100 $\mu$s. pulses and the 500 μs. pulses are supplied over conductors 84 and 86 to a common output lead 87. The 1000 μs. pulses are supplied to output leads 88 and 89. In the example illustrated, the lead 87 and the lead 88 connect to a common output lead 91. The lead 91 supplies the 100 μs. pulses, the 500 μs. pulses and the 1000 μs. pulses to the vertical deflecting plates of a cathode ray tube (not shown), the cathode ray of which is deflected horizontally by the waves from the deflecting circuit 70 in synchronism with the 40,000 μs. square wave. It is evident that the 40,000 μs. cycle of horizontal deflection has a fixed time relation to the 20,000 μs. pulses and to the timing marker pulses.

Referring now more particularly to the feature of subtracting counts for the purpose of station selection, specific pulse repetition rates for a plurality of pairs of ground transmitter stations will be referred to by way of example to aid in explaining the operation.

It will be assumed that the first pair of ground stations transmit the A pulses with a repetition period of 40,000 μs. and transmit the B pulses with a like repetition period; that the second pair of ground stations transmit A and B pulses having a repetition period of 39,900 μs.; that the third pair transmits 39,800 μs. pulses; that the fourth pair transmits 39,700 μs. pulses, etc. It is apparent that for station selection at the receiving apparatus, the operator must be able to select corresponding repetition periods for the output of the square wave generator 61 which controls the cathode ray deflection cycle; namely, periods of 40,000 μs.; 39,900 μs.; 39,800 μs.; 39,700 μs.; 39,600 μs.; etc.

It will be noted that the several repetition periods differ from each other by 100 μs. or by integral multiples thereof, and that this corresponds to repetition period differences of 50 μs. or integral multiples thereof at the output of the frequency divider chain, i. e., at the input of the clipper 60. Therefore, the desired repetition period can be obtained by shortening the 20,000 μs. period by 50 μs., by 100 μs., by 150 μs., etc.

For example, to obtain the 39,900 μs. repetition period the switches 64 and 67 are moved to the No. 2 switch contact points. At this switch position the 20,000 μs. pulses from the lead 62 are fed back by way of the "bucket" capacitor 63, the switch 64 and the conductor 26 to the frequency divider 16 only. Upon the occurrence of a 20,000 μs. pulse, it produces a pulse of current through the "bucket" capacitor 63 and through the diode 23 to add a charge to the storage capacitor 21. At the end of the pulse, the capacitor 63 discharges through the diode 24 to its original potential. By properly selecting the capacity value of the "bucket" capacitor 63, the added charge is made equal to the charge which is added to the capacitor 21 by a single 50 μs. pulse. Thus, the 20,000 μs. pulse causes the blocking oscillator 22 to fire one pulse earlier or 50 μs. sooner than it normally would whereby the desired repetition period of 19,950 μs. at the clipper 60 or 39,900 μs. at the output of the E-J oscillator 61 is obtained. It may be noted that, in the example given, each time a 20,000 μs. pulse occurs, the divider 16 divides by one instead of by two.

To obtain the 39,800 μs. repetition period, the switches 64 and 67 are moved to position No. 3. Now the 20,000 μs. pulses are applied through the "bucket" capacitor 71 to the divider 33 and upon the occurrence of a 20,000 μs. pulse it applies a charge to the capacitor 39 through the diode 48. At the end of the pulse the capacitor 71 discharges through the diode 47 to its original potential. The capacitor 71 is given a capacity value such that this charge applied by the 20,000 μs. pulse is equal to the charge applied by a single 100 μs. pulse. Thus, upon the occurrence of a 20,000 μs. pulse the blocking oscillator 41 fires one pulse early or 100 μs. sooner than it normally would whereby the desired repetition period of 19,900 μs. is obtained at the clipper 60 or 39,800 μs. at the E-J oscillator output. It may be noted that in the example given, the divider 33 divides by four instead of by five upon the occurrence of each 20,000 μs. pulse.

To obtain the 39,700 μs. repetition period, the switches 64 and 67 are moved to the No. 4 position, this being the switch position shown in the drawing. Now the 20,000 μs. pulses are applied to both the divider 16 and the divider 33 through the switches 64 and 67 whereby both dividers lose a count. Specifically, the blocking oscillators 22 and 41 of dividers 16 and 33 fire 50 μs. and 100 μs. early, respectively, or a total of 150 μs. early. Thus, the desired repetition period of 2×19,850 μs. or 39,700 μs. is obtained at the E-J oscillator output.

To obtain the 39,600 μs. repetition period, the switches 64 and 67 are moved to the No. 5 position. Again the 20,000 μs. pulses are applied to the divider 33 only, but this time through the capacitor 72 which has a capacity value such that a 20,000 μs. pulse causes the divider 33 to lose two counts, i. e., to trigger 200 μs. early. Thus, the desired period of 2×19,800 μs. or 39,600 μs. is obtained at the E-J oscillator.

At the No. 6 switch position, the divider 16 again triggers 50 μs. early and the divider 33 triggers 200 μs. early, or a total of 250 μs. for the two dividers. Thus, the repetition period is 19,750 μs. at the input to clipper 60 or 39,500 μs. at the output of the E-J oscillator 61.

At the No. 7 switch position, only the divider 33 receives the 20,000 μs. pulses. These pulses are applied through the capacitor 73 which is adjusted to make the divider 33 lose three counts. Thus, it triggers 300 μs. early to give a repetition period of 2×19,700 μs. or 39,400 μs. at the E-J oscillator output.

At the No. 8 switch position, both of the dividers 16 and 33 lose counts, divider 16 triggering 50 μs. early and divider 33 triggering 300 μs. early, or a total of 350 μs. whereby the repetition period is 19,650 μs. at the clipper 60 or 39,300 μs. at the E-J oscillator output.

It may be preferred to employ a different group of repetition periods than the group of 40,000 μs., 39,900 μs., etc. assumed above. By making the final divider stage 59 divide by three, for example, instead of by four, the divider chain output pulses have a repetition period of 15,000 μs. so that a group of repetition periods of 30,000 μs., 29,900 μs., etc., may be employed. Or the divider stage 59 may be made to divide by five to obtain a group of repetition periods of 50,000 μs., 49,900 μs., etc.

In order to obtain a more rapid right "drift" of the A and B pulses in the preliminary steps of obtaining a time difference reading, it may be desirable to provide a capacitor 95 that may be connected by a switch 96 to the coupling capacitor 66 so that by closing the switch 96 additional counts will be lost by the divider 33. Thus, the A and B pulses may be drifted toward the right by closing the switch 96. When the switch 96 is opened the A and B pulses stop drifting and again are stationary.

From the foregoing it will be apparent that the chain of frequency dividers provides the desired decimal relation timing marker pulses of 10 μs., 100 μs. and 1000 μs. in addition to providing the other desired groups of pulses. It will also be apparent that the number of repetition periods available in a repetition period group is not limited to the largest number by which the frequency is divided in a single frequency divider; the number of repetition periods in the example described being eight (i. e., 40,000 μs., 39,900 μs., etc., to 39,300 μs.) while the largest frequency division step is five. This makes it possible to obtain from the frequency divider chain the decimal relation pulses in addition to the other desired pulses, and it also improved the tightness of the frequency lock-in because of the smaller steps of frequency division employed.

I claim as my invention:

1. A generator for producing periodically recurring electrical pulses, said generator comprising a comparatively high frequency oscillator and a chain of frequency dividers connected to receive signal from said oscillator, two of said dividers including count subtracting means for causing the divider to lose a predetermined number of repetition period counts upon the application of an electrical pulse thereto, and means for selectively applying electrical pulses from the output of said divider chain to the count subtracting means of said two dividers.

2. A generator for producing periodically recurring electrical pulses, said generator comprising a comparatively high frequency stable oscillator and a chain of frequency dividers connected to receive signal from said oscillator, at least two of said frequency dividers being of the counter circuit type including a storage capacitor that is charged in steps in response to the application of successive pulses, each of said two dividers including count subtracting means for causing the divider to lose a predetermined number of repetition period counts upon the application of an electrical pulse thereto, and means for selectively applying electrical pulses from the output of said divider chain to the count subtracting means of said two dividers.

3. A timing pulse generator comprising a stable oscillator and a chain of frequency dividers connected to receive signal from said oscillator, at least two of said dividers being of the counter circuit type including a storage capacitor that is charged in steps in response to the application of successive pulses and each of said two dividers including count subtracting means to make the divider lose a predetermined number of repetition period counts, and switching means for selectively applying the output pulses of said chain to the count subtracting means of said two dividers for obtaining a plurality of selected repetition periods for said output pulses, the number of repetition periods that may be selected being greater than the number by which any one frequency divider of the chain divides the frequency.

4. The invention according to claim 3 wherein the output signals of three of the frequency dividers in said divider chain have a decimal relation to each other.

5. A timing pulse generator comprising a stable oscillator and a chain of frequency dividers connected to receive signal from said oscillator, at least two of said dividers being of the counter circuit type including a storage capacitor that is charged in steps in response to the application of successive pulses and each of said two dividers including count subtracting means to make the divider lose a predetermined number of repetition period counts, and switching means for selectively applying the output pulses of said chain to either one or to both of the count subtracting means of said two dividers for obtaining any one of a plurality of selected repetition periods for said output pulses, the number of repetition periods that may be selected being greater than the number by which any one frequency divider of the chain divides the frequency.

6. A timing pulse generator comprising a stable oscillator and a chain of frequency dividers connected to receive signal from said oscillator, at least two of said dividers being of the counter circuit type including a storage capacitor that is charged in steps in response to the application of successive pulses, each of said two dividers including a count subtracting circuit comprising means for charging said storage capacitor an additional predetermined number of steps in response to the application of a pulse to make the divider lose a predetermined number of counts, and switching means for selectively applying the output pulses of said chain to either one or both of the count subtracting means of said two dividers for obtaining a plurality of selected repetition periods for said output pulses, the number of repetition periods that may be selected being greater than the number by which any one frequency divider of the chain divides the frequency.

7. A timing pulse generator comprising a stable oscillator and a chain of frequency dividers connected to receive signal from said oscillator, at least two of said dividers being of the counter circuit type including a storage capacitor that is charged in steps in response to the application of successive pulses, each of said two dividers including a count subtracting circuit comprising means for charging said storage capacitor an additional predetermined number of steps in response to the application of a pulse to make the divider lose a predetermined number of counts, and switching means having successive station selection positions for selectively applying the output pulses to said chain successively first to one of said count subtracting means, then to the other of said count subtracting means and then to both of said count subtracting means for obtaining a plurality of selected repetition periods for said output pulses, the number of repetition periods that may be selected being greater than the number by which any one frequency divider of the chain divides the frequency.

8. A timing pulse generator comprising a stable oscillator and a chain of frequency dividers connected to receive signal from said oscillator, at least two of said dividers being of the counter circuit type including a storage capacitor that is charged in steps in response to the application of successive pulses, each of said two dividers including a count subtracting circuit comprising means for charging said storage capacitor an additional predetermined number of steps in response to the application of a pulse to make the divider lose a predetermined number of counts, and switching means having successive station selection positions for selectively applying the output pulses to said chain to the second of said count subtracting means and for increasing the number of counts subtracted at every other switch position and for selectively applying said output pulses to both of said count subtracting means at the switch positions located between said every other switch positions for obtaining a plurality of selected repetition periods for said output pulses, the number of repetition periods that may be selected being greater than the number by which any one frequency divider of the chain divides the frequency.

9. A timing pulse generator comprising a stable oscillator and a chain of frequency dividers connected to receive signal from said oscillator, at least two of said dividers being of the counter circuit type, each of said two dividers including a storage capacitor that is charged in steps in response to the application of successive pulses, each of said two dividers including a count subtracting circuit, the count subtracting circuit of the first of said two dividers including in series with each other a diode, a capacitor, and a switch through which the storage capacitor of said first divider is charged an additional predetermined number of steps in response to the application of a pulse whereby said first divider is made to lose a predetermined number of counts, the count subtracting circuit of the second of said two dividers including in series with each other a diode, a plurality of capacitors and a switch which may be selectively connected to any one of said plurality of capacitors, the storage capacitor of said second divider being charged an additional predetermined number of steps in response to the application of a pulse through said last series-connected circuit, each of said plurality of capacitors having a different capacity value for causing the count subtracting circuit of said second divider to subtract different numbers of counts depending upon which of the capacitors is in said last series circuit, said switches being ganged and having successive station selection positions for applying the output pulses to the second of said count subtracting circuits through one of said plurality of capacitors for two station selection positions and for applying said output pulses to the first count subtracting circuit in addition through the capacitor of the first series circuit at only one of said two station selection positions, and for applying said output pulses through another of said plurality of capacitors for two other station selection positions and through the capacitor of said first subtracting circuit in addition at only one of said last-mentioned pair of station selection positions whereby there may be obtained a plurality of selected repetition periods for said output pulses.

EARL SCHOENFELD.

REFERENCES CITED

The following references are of record in the file of this patent:

UNITED STATES PATENTS

| Number | Name | Date |
| --- | --- | --- |
| 2,113,011 | White | Apr. 5, 1938 |
| 2,132,654 | Smith | Oct. 11, 1938 |
| 2,277,000 | Bingley | Mar. 17, 1942 |

FOREIGN PATENTS

| Number | Country | Date |
| --- | --- | --- |
| 479,935 | Great Britain | Feb. 14, 1938 |

OTHER REFERENCES

RCA Review for July 1940, vols. 5–6, pp. 57–59. Copy in Div. 51.